June 9, 1964     E. W. RADTKE     3,136,882
MEANS FOR ELECTRON BEAM WELDING WITHOUT A VACUUM CHAMBER
Filed March 28, 1962
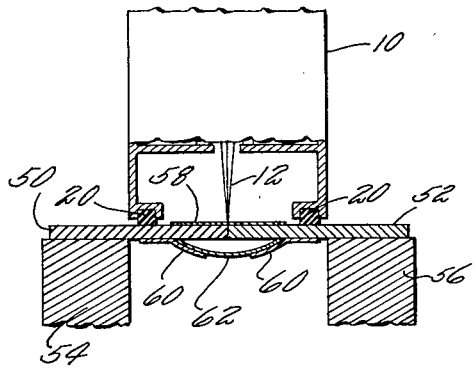
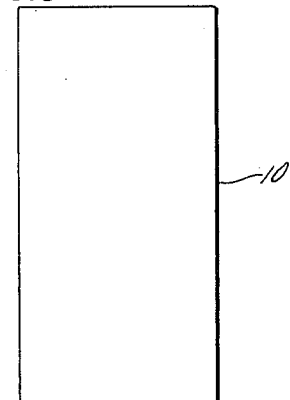
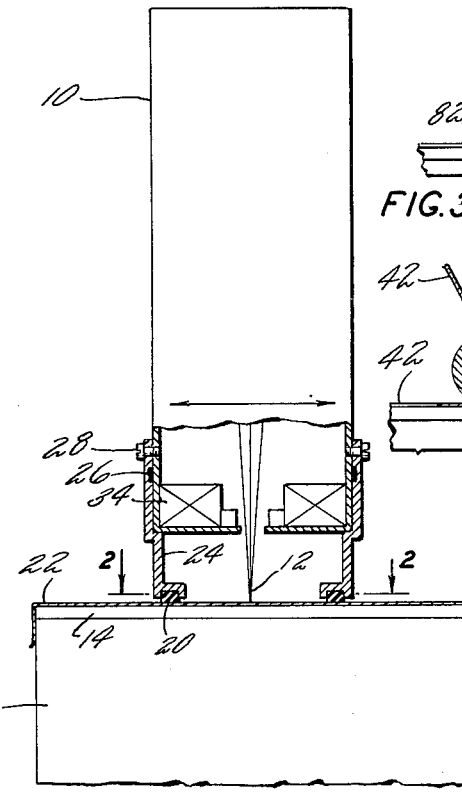
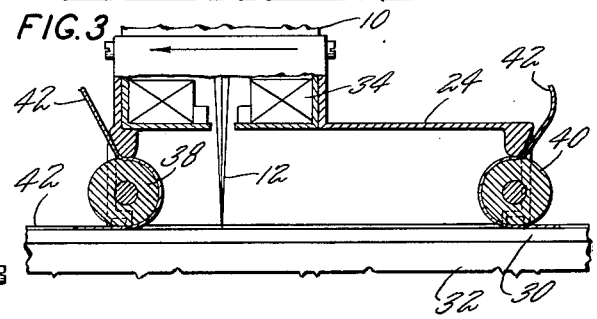
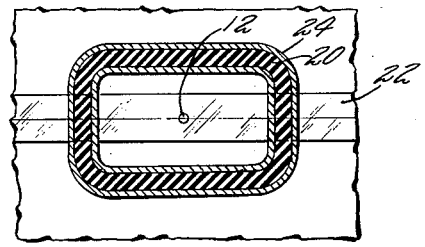
INVENTOR
EDWARD W. RADTKE
BY
AGENT United States Patent Office 3,136,882
Patented June 9, 1964

3,136,882
MEANS FOR ELECTRON BEAM WELDING WITH-
OUT A VACUUM CHAMBER
Edward W. Radtke, Bloomfield, Conn., assignor to
United Aircraft Corporation, East Hartford, Conn., a
corporation of Delaware
Filed Mar. 28, 1962, Ser. No. 183,096
8 Claims. (Cl. 219—117)

My invention relates to working a material with a beam of charged particles. More particularly, my invention relates to performing operations such as welding, cutting, melting, vaporizing, heating or machining on any material with an electron beam.

Electron beam machines, as they are generally known, are devices which use the kinetic energy of an electron beam to work a material. U.S. Patent No. 2,793,281, issued May 21, 1957, to K. H. Steigerwald, discloses such a machine. These machines operate by generating a highly focused beam of electrons. The electron beam is a welding, melting, vaporizing, heating, cutting and machining tool which has practically no mass but has high kinetic energy because of the extremely high velocity imparted to the electrons. Transfer of this kinetic energy to the lattice electrons of the work piece generates higher lattice vibrations which causes an increase in the temperature within the impingement area sufficient to accomplish work.

Prior to my invention, pieces to be worked by an electron beam process were placed in an evacuated chamber. Working in a vacuum is necessary for several reasons. First, any gas in the region surrounding the part being worked will cause impurities in the work piece. Secondly, the presence of gas causes scattering of the electron beam thereby preventing the precise focusing necessary to accomplish work at one spot without the material adjacent thereto being affected by heat conductivity. Also, any gas present will cause rapid oxidation of and thus destroy the electron emitting element of the machine. For smaller parts, use of a vacuum chamber is acceptable but inconvenient. For large parts, the cost of the chamber and associated vacuum pumps is so expensive that it becomes impracticable. For example, it would be desirable to weld the shell which forms the tank of a missile with an electron beam process. This part is frequently large in diameter and length but quite thin. It preferably should be made by rolling a thin sheet into a cylinder and joining the ends with a longitudinal weld. Because of the types of metal used and the thinness of these metals, electron beam welding is very desirable for this application. However, before my invention, the vacuum chamber size required was so large and, consequently, expensive as to make the process impracticable.

My invention overcomes the above disadvantages by providing a novel method for eliminating the work enclosing vacuum chamber when working large parts with an intense beam of electrons.

It is, therefore, an object of my invention to work materials with a beam of charged particles with the major part of the work outside of the vacuum.

It is an object of my invention to provide a local vacuum in the area being worked by a beam of charged particles.

It is also an object of my invention to rapidly and inexpensively work large pieces with a beam of charged particles.

These and other objects of my invention are accomplished by placing a sealing tape over an area to be worked and subsequently evacuating the area under the tape thereby forming a local vacuum. For example, when welding the tank of a missile my invention eliminates the necessity of having a vacuum chamber around the cylinder by placing pressurized tape over both sides of the joint to be welded. The electron beam column of a machine such as that shown in the above-mentioned Steigerwald patent is fitted with a race-track shaped shoe which is formed to fit the shape of the surface of the tank. Prior to placing the column in position over the tape, a small hole is made in the tape at the intended initial beam impingement point. The column is then placed against the tape and both the column and the joint are evacuated with the relatively small vacuum pump associated with the column. The gap between the shoe and the tape and surface is sealed by a sliding seal such as a lip seal. The surface of the tank and the tape are preferably coated with vacuum grease to improve the sealing and to facilitate the sliding of the electron beam column along the tape. During welding, the beam burns a path in the tape as it welds the joint and the trailing lip seal provides an air-tight seal between the column and the weld.

My invention may be better understood with reference to the accompanying drawing wherein like reference numerals refer to like elements in the different figures, and in which:

FIGURE 1 is a view of one embodiment of my invention.

FIGURE 2 is a section view along line 2—2 of the apparatus shown in FIGURE 1.

FIGURE 3 illustrates a second embodiment of my invention.

FIGURE 4 is an end section view illustrating a feature of my invention which may be employed with any of the embodiments shown in the other figures.

FIGURE 5 is a view of still another embodiment of my invention.

Referring now to FIGURE 1, an electron beam column is shown at 10. This column contains means, not shown, for emitting electrons, focusing the electrons into a beam and accelerating the beam toward a work piece. The beam formed in column 10 is shown at 12. The work piece, which may be two flat plates to be joined by a butt weld, is shown at 14 resting on a table 16. The pressure exerted by work piece 14 against table 16 may be sufficient to provide an air-tight seal therebetween. This seal may be improved by the use of vacuum grease. If the work pieces are other than flat plates, for example, hollow structures of limited volume, the joint opposite to that being worked by the electron beam process may have previously been sealed by another process such as arc welding or brazing. A pressure sensitive tape 22 is cemented over the upper side of the joint to be welded. The electron beam column 10 is fitted with a shoe 24. Shoe 24 is attached to the column by bolts 28 and an air-tight seal between the column and the shoe is provided by seal 26. A section view of shoe 24 is shown in FIGURE 2. The bottom edge of shoe 24 has a race-track shape and is formed so as to fit the contour of the piece being welded. Shoe 24 is placed against tape 22 and is maintained in sealing relationship thereto by a seal 20 which extends completely around the bottom of the shoe. Seal 20 will slide on top of tape 22 and the work piece while maintaining the vacuum. The sliding and sealing action may be enhanced by coating the tape with vacuum grease. A hole may be punched in tape 22 prior to positioning the column thereon. The column and the joint are then evacuated simultaneously by a small vacuum pump, not shown, associated with the column. Alternately, the column may be evacuated first, a hole drilled in the tape with the electron beam and the joint then evacuated. Once the joint to be welded and column are evacuated, the welding is performed in the manner taught in U.S. Patent No. 2,987,610, issued June 6, 1961, to K. H. Steigerwald, as the column slides along the tape. The portion of the joint to the rear of the moving column is, of course, sealed by the weld, and the seal 20 presses against the weld to prevent leakage into the shoe 24.

Referring now to FIGURE 3, an embodiment of my invention is illustrated which has means for picking up uncemented tape forward of the electron beam column as it moves along the joint being welded and placing the tape back over the joint behind the column. In FIGURE 3, the piece to be welded 30 is positioned on a table 32. An air-tight seal may be maintained between the piece and table as described in connection with FIGURE 1, or a piece of pressure sensitive tape may be employed to seal the underside of the joint. The electron beam column 10 contains means 34 for focusing the electron beam 12 at the joint to be welded. The column 10 has a shoe 24, similar to that described in connection with FIGURE 1, shaped to fit the surface of the work. The gap between the shoe and the work at the sides of the shoe is sealed by a lip seal, not shown, such as seal 20 of FIGURE 1, which slides on the work. At the leading and trailing ends of shoe 24, sealing is accomplished by use of elastomeric rollers 38 and 40 respectively. A tape 42, which may preferably be made of a soft elastomer reinforced by fabric to prevent its stretching longitudinally, is placed over the joint to be welded both in front of and behind shoe 24. When the column and joint are evacuated, elastomer tape 42 will be sucked into the joint by the difference in pressure thereby forming an air-tight seal. As the joint is welded, column 10 is moved along tape 42 and the tape is taken off the work by the front roller 38 and returned to the work by rear roller 40. In between the rollers the tape exists in a free loop which can be outside the vacuum or inside the shoe. Rollers 38 and 40 are made larger than the openings in the front and back of shoe 24 to insure that there will be no gap between the shoe and the rollers. It is necessary to use rear roller 40 to reapply the tape because the section of the joint between the position where the electron beam begins to weld and roller 40, if not previously closed, will not be filled by the weld. Consequently, if the tape is not reapplied to this section, the vacuum in the column may be destroyed by passage of air through the unwelded section. As in the embodiment of FIGURE 1, sealing and sliding may be improved by use of vacuum grease.

Referring now to FIGURE 4, it is possible, when using tape to seal the underside of a joint to be welded, that the electron beam may burn through this lower tape and thereby allow leakage of air into the joint and column. FIGURE 4 shows a manner of insuring against this occurrence. In FIGURE 4, the electron beam 12 emanating from column 10 is shown welding a joint between pieces 50 and 52 which are supported by supports 54 and 56. The electron beam column 10 is sealed against pieces 50 and 52 and a tape 58 covering the upper side of the joint by means of lip seal 20. A channel 62 which is preferably metallic and, therefore, reuseable is positioned on the underside of the work pieces so as to bridge the joint. Pressure sensitive tapes 60 are employed to seal channel 62 against pieces 50 and 52. A wide single piece of tape may, of course, be used rather than the two narrow pieces shown in FIGURE 4. It is also possible to eliminate tapes 60 by providing seals in the metallic channel where it meets the work piece on either side of the joint. It is to be understood that the ends of the joint and the channel are also sealed by suitable means such as lengths of pressure sensitive tape and that the area inside the channel is evacuated through the joint before welding is begun.

Referring now to FIGURE 5, under certain conditions the tape on the electron beam column side of the work piece will be burnt away a short distance behind the spot where the weld actually starts. When the trailing edge of the shoe passes over the hole thus formed, leakage into the shoe by way of the unwelded section of the joint behind the spot where the weld was started will occur. This leakage can be prevented by the embodiment of FIGURE 5 which is an alternative to the embodiment illustrated in FIGURE 2. A foot or so of spare tape is spooled on a roller 80 mounted inside shoe 24. A tape 82 is placed over the joint to be welded from the leading edge of shoe to the end of the joint. The tape 84 on the roll 80 is passed out under the trailing edge of the shoe and placed over the joint to the other end thereof. As the column moves relative to the work and the weld is made, the extra tape on spool 80 is laid down to seal the unwelded section of the joint between the starting point of the trailing end of the shoe and the spot where the weld was started. The extra tape 84 is long enough to extend past the start of the weld. From the point where the tape on spool 80 is expended to the end of the weld, the seal between lip seal 20 and the weld itself prevents leakage into the shoe.

While my invention has been discussed in terms of welding with an electron beam, other operations such as drilling, cutting and machining may be performed with the aid of my invention without deviating from the scope and spirit thereof. Also, while preferred embodiments of my invention have been shown and disclosed, it is to be understood that my invention has been described by way of illustration rather than limitation and accordingly it is to be limited only by the appended claims taken in view of the prior art.

I claim:
1. A method of welding outside of a vacuum chamber with an electron beam comprising:
   placing a longitudinal strip of tape over at least one edge of a joint to be welded,
   positioning the beam forming and accelerating column of an electron beam welding machine in sealed relationship to the exposed surface of the tape and the adjacent pieces which form the joint to be welded,
   evacuating said column and the area of the joint, and
   welding the joint with the electron beam generated in the column.
2. The method of claim 1 wherein the step of welding comprises:
   energizing the electron beam welding machine, and
   causing the beam forming and accelerating column to slide along the joint while maintaining the sealed relationship between the column and the tape and adjacent surfaces.
3. The method of claim 1 further comprising:
   placing a second longitudinal strip of tape over the second edge of the joint to be welded.
4. The method of claim 3 wherein the step of placing the second strip of tape over the second side of the joint comprises:
   forming a downwardly extending loop in the center of the second longitudinal strip of tape, and
   sealing the tape to the surfaces of the pieces which comprise the joint in such a manner the loop portion is beneath and follows the joint to be welded.
5. The method of claim 2 further comprising the steps of:
   picking up the tape at the forward edge of the column as it moves along the joint, and
   reapplying the tape at the trailing edge of the column.
6. The method of claim 2 further comprising the step of:
   applying a strip of tape over the portion of the joint lying between the trailing edge of the electron beam column and the point where the weld was started.
7. A method of working materials with a beam of charged particles comprising:
   placing a pressure sensitive tape over an area of the material to be worked,
   positioning a charged particle generator in sealed relationship to said tape and said material,
   evacuating said charged particle generator and the area under said tape, and working the area under said tape with the charged particles emanating from said generator.

8. The method of claim 7 wherein the step of working the area under the tape with charged particles comprises:
activating the charged particle generator, and
sliding the charged particle generator along the tape while maintaining the vacuum.

References Cited in the file of this patent

UNITED STATES PATENTS

| | | |
|---|---|---|
| 2,778,926 | Schneider | Jan. 22, 1957 |
| 2,812,417 | Busse et al. | Nov. 5, 1957 |
| 2,907,704 | Trump | Oct. 6, 1959 |
| 2,922,023 | Hackman et al. | Jan. 19, 1960 |
| 2,932,720 | Stohr | Apr. 12, 1960 |
| 3,001,057 | Hackman et al. | Sept. 14, 1961 |